3,395,987
FIELD METHOD FOR THE DETERMINATION OF SILVER IN SOILS AND ROCKS
Harry M. Nakagawa, Denver, and Hubert W. Lakin, Lakewood, Colo., assignors to the United States of America as represented by the Secretary of the Interior
No Drawing. Filed Feb. 17, 1966, Ser. No. 529,606
5 Claims. (Cl. 23—230)

This invention relates to the field determination of the presence and amount of silver in geologic materials such as soils and rocks.

Spectrographic analysis has been used for silver determinations, but high instrumentation costs as well as the limited sensitivity of spectrography are distinct disadvantages. Present chemical reaction type field methods possess inadequate sensitivity and selectivity.

The object of the present invention is to provide a rapid, sensitive, selective field method useful in geochemical exploration for the determination of silver in geologic materials.

It has now been discovered that the presence and amount of silver in geologic samples may be readily and accurately obtained by (1) digesting the sample in nitric acid; (2) extracting silver from the resultant acid solution with tri-isooctyl thiophosphate (TOTP) in organic carrier solvent; (3) stripping the resultant organic extract phase wtih dilute HCl; (4) determining the amount of silver in the HCl by its catalytic action on the persulfate oxidation of manganous ion to purple permanganate.

For a more detailed understanding of the invention reference is to be had to the following description.

A finely ground sample of the geologic material is digested in nitric acid to dissolve out any silver compounds and elemental silver therein. If it is suspected that the sample contains silver chlorides in excess of 20 p.p.m. (silver chloride being relatively insoluble in nitric acid), the sample should be fused with ammonium persulfate prior to acid digestion to convert the silver present as chlorides to a more soluble form.

After all the silver compounds and elemental silver are digested in acid, silver is then extracted from the acid solution with tri-isooctyl thiophosphate (TOTP) in a carrier solvent such as benzene, carbon tetrachloride, or toluene. TOTP is added to the carrier solvent in amounts ranging from 15 to 50 percent by volume of the organic extractant solution. Preferably 30% by volume TOTP is employed. 0.5 to 1 part by volume of organic solution per part of acid solution is suitable for the purposes of this invention.

After separating the aqueous raffinate phase from the organic extract phase, silver is extracted from the organic phase with approximately an equal volume of dilute HCl. An optimum concentration of about 0.3 N HCl is employed because the stripping ability of the acid at this concentration is the highest that can be obtained without having any adverse effects on the later catalytic reaction.

The organic raffinate phase resulting from the HCl extraction operation is discarded and potassium persulfate is added to the dilute HCl extract phase to oxidize the silver in the extract phase, which in turn, catalytically aids in the oxidation of manganous ion to permanganate. The rate at which manganese is oxidized (the intensity of the purple permanganate color imparted to the solution after a set period of time) is therefore representative of the amount of silver present. To determine the amount of silver present in the sample, the purple color of the test sample is compared, intensity-wise, to a series of standard permanganate solutions each prepared with varying known amounts of silver.

Since silver ions tend to be adsorbed on glass, the analysis must be carried out with dispatch before the silver in the dilute HCl solution has a chance to be adsorbed by the glass container (e.g., test tube) in which the solution is held. Test tubes should be carefully cleaned between analyses with dilute cyanide solution to remove any silver that may have been adsorbed on previous tests.

Some substances may interfere with each phase of the procedure of this invention but the overall method is virtually specific for silver. For example, TOTP may extract other elements such as palladium from the raw sample. However, palladium has no catalytic effect during the manganous oxidation step. Incomplete separation of the organic and aqueous acid phases during the acid stripping step offers the most serious interference to the test. This interference is caused by TOTP that may remain in the HCl extract phase and which forms a yellow wax during persulfate treatment. This condition is remedied by a preliminary heating of the HCl extract phase with potassium persulfate after taking an aliquot for the catalytic procedure.

The following example illustrates a typical test procedure:

Sample solution (1) Place 1 g. (or one 1-g. scoopful) of the finely powdered sample in a 16- by 150-mm. culture tube.

(2) Add one Teflon-covered magnet and 5 ml. concentrated $HNO_3$.

(3) Place the tube, containing sample and $HNO_3$, in an aluminum heating block over a magnetic stirrer and allow the acid to boil for 30 minutes. Adjust the heat so that the upper part of the culture tube serves as a condenser, thus conserving the $HNO_3$.

(4) Add 5 ml. of demineralized water and again heat to boil.

(5) Allow to cool.

Extraction (1) Add 5 ml. of TOTP solution to the contents of the culture tube, stopper the tube with a cork, and shake the tube for 1 minute.

(2) Allow the phases to separate and, with an automatic pipet, transfer the organic phase to a second 16- by 150-mm. culture tube.

(3) Add 10 ml. 0.3 N HCl to the second tube, stopper with a clean cork, and shake the tube for 1 minute.

(4) Remove the organic phase with an automatic pipet and discard.

Oxidation of TOTP in 0.3 N HCl extract (1) Transfer 5 ml. of the 0.3 N HCl extract to an 18- by 150-mm. culture tube. If a smaller aliquot is taken make the volume up to 5 ml. with 0.3 N HCl.

(2) Add 1-g. scoopful of $K_2S_8O_8$, place in a boiling water bath at 8–100° C. and heat for 10 minutes.

(3. Remove and cool the solution.

Estimation (1) To the cool solution add 1 ml. $H_3PO_4$, 1 ml. $MnSO_4$ solution, 5 ml. demineralized water, and 5–6 1-g. scoopsful of $K_2S_2O_8$.

(2) Mix thoroughly with glass stirring rod and again place in boiling water bath.

(3) After heating for exactly 10 minutes at 98–100° C., remove the sample solution from the boiling water bath and chill rapidly in an ice bath.

(4) When cold, crush with a stirring rod the fused crystals of $K_2S_2O_8$ and $K_2SO_4$ that crystallized on cooling.

Leave in ice bath until the upper inch or so of the permanganate solution is clear.

(5) Compare the sample solution with standards prepared at the same time.

Preparation of standards

Pipet 10 micrograms Ag in the form of a silver standard solution into a tube containing 5 ml. 8N $HNO_3$. Add 5 ml. TOTP and shake for 1 minute. Allow the phases to separate and transfer the organic layer to a second tube containing 10 ml. 0.3 N HCl. Shake for 1 minute and discard organic layer. Transfer appropriate aliquots of the HCl solution, corresponding to 0, .005, .01, .05, .1, .2, .4, and .8 microgram Ag, into tubes containing 5 ml. 0.3 N HCl. Add 1 g. $K_2S_2O_8$ to each tube and heat in boiling water bath at 98–100° C. for 10 minutes. Cool and add 1 ml. $H_3PO_4$, 1 ml. $MnSO_4$, 5 ml. demineralized water and approximately 5–6 g. $K_2S_2O_8$. Place in boiling water bath and proceed as with sample. The acid permanganate solution slowly fades, so standards must be made with each group of samples. The samples and standards may be kept in an ice bath for about an hour without any noticeable fading.

Reagents

Potassium persulfate, reagent-grade.

Nitric acid, concentrated, reagent-grade.

Nitric acid, 8 N: Dilute 1 part concentrated nitric acid with 1 part demineralized water.

Triisooctyl thiophosphate in benzene; Dilute 300 ml. TOTP with 700 ml. benzene.

Hydrochloric acid, 0.3 N: Dilute 25 ml. concentrated HCl to 1 liter with demineralized water.

Phosphoric acid, reagent-grade: Dilute 1 to 1 with demineralized water.

Manganous sulfate: Dissolve 0.5 g. $MnSO_4 \cdot H_2O$ in 500 ml. demineralized water.

Silver standard solution, 0.01 percent in 0.1 N nitric acid: Dissolve 0.158 g. $AgNO_3$, in 1,000 ml. of 0.1 N nitric acid solution.

The sensitivity of the process of this invention is due to the catalytic procedure. It has long been known that reactions of this type are extremely sensitive and involve primarily a rate measurement. Therefore, time and temperature of such reactions and concentration of the reactants must be carefully controlled. For the proposed silver method the critical aspects of the catalytic phase are temperature of reaction and concentration of oxidant. A salt bath or a 1:1 solution of ethylene glycol and water is used to keep the temperature at 98°–100° C. and an excess of potassium persulfate is maintained to insure the dependency of rate of oxidation of manganous iron to permanganate upon the amount of silver present.

The following table indicates the precision of the process:

TABLE 1.—REPLICATE DETERMINATIONS OF SILVER

| Sample No. | Trdts Silver (p.p.m.) | | | | | | | Mean | Relative standard deviation (percent) |
|---|---|---|---|---|---|---|---|---|---|
| | 1 | 2 | 3 | 4 | 5 | 6 | 7 | | |
| 1 | 5 | 5 | 4 | 3 | 3 | 3 | 3 | 3.7 | 25.7 |
| 2 | 5 | 2.5 | 2.5 | 3 |  | 3 | 4 | 3.3 | 29.5 |
| 3 | 2 | 3 | 2 | 2.3 | 3.2 | 2 | 3 | 2.5 | 27.1 |
| 4 | 1 | 1.5 | 1.5 | 1.2 | 1.2 | 1.2 | 1.6 | 1.3 | 16.6 |
| 5 | .75 | .75 | .3 | .4 | .12 | .12 | .6 | .43 | 63.0 |
| 6 | .3 | .12 | .28 | .4 | .14 |  |  | .25 | 46.8 |
| 7 | .05 | .05 | .04 | .04 | .02 | .01 | .02 | .03 | 47.9 |
| 8 | .05 | .02 | .02 | .04 | .02 | .01 | .02 | .03 | 21.5 |

The large relative deviations of 63%, 46.8% and 47.9% as shown in the above table are probably caused by lack of homogeneity in the sample. A relative standard deviation of 20 to 50% appears to be a reasonable measure of the precision of the method.

The following tables indicate the reliability and accuracy of the process by comparing the process with other detection methods.

TABLE 2.—COMPARISON OF FIRE ASSAY AND THE FIELD PROCESS OF THE PRESENT INVENTION

| Sample No. | Silver content (p.p.m.) | | | | | |
|---|---|---|---|---|---|---|
| | Field process of the present invention | | | | | Fire Assay |
| | 0.1 g. sample | 0.2 g. sample | 0.5 g. sample | 1.0 g. sample | Average of 4 analyses | |
| 1 | 60 | 50 | 60 | 30 | 50 | 50 |
| 2 | 2 | 3.8 | 6 | 4 | 3.95 | 4.8 |
| 3 | 5 | 3.5 | 4 | 7.5 | 5 | 7 |

TABLE 3.—COMPARISON OF THE FIELD PROCESS OF THE PRESENT INVENTION WITH A SEMIQUANTITATIVE SPECTROGRAPHIC METHOD

| Mineral constituting major component of sample | Silver content (p.p.m.) | |
|---|---|---|
| | Field Process of Present Invention | Semiquantitative Spectrographic Method |
| Arsenopyrite | 30 | 30 |
| Allanite | 2 | 1.5 |
| Cervantite | .5 | 7 |
| Chalcopyrite | 150 | 300 |
| Cerussite | 100 | 300 |
| Descloizite | .7 | 1.5 |
| Galena | 600 | 700 |
| Gold quartz and pyrite | 7.5 | 7 |
| Glauconite | 10 | 7 |
| Hemimorphite | 3.5 | 7 |
| Hydrozincite | 30 | 15 |
| Molybdenite | 10 | 15 |
| Niccolite | 50 | 70 |
| Psilomelane | .5 | 1.5 |
| Pyrrhotite | 3.5 | 7 |
| Pyrite | 4 | 3 |
| Pentlandite | 4 | 2 |
| Samaltite | 1,600 | 700 |
| Scheelite | 400 | 700 |
| Thorite | 8 | 1.5 |
| Tetrahedrite | 4,000 | 7,000 |
| Anglesite | 500 | 1,500 |
| Antimony | 200 | 300 |

Table 2 indicates that analysis by the process of the present invention agrees favorably with fire assay analysis. Table 3 indicates that the process may be expected to agree with the results shown therein about 60% of the time.

A rapid, sensitive, specific-to-silver field method for determination of silver in geologic materials is offered by the process of the present invention. No special and expensive apparatus is required. About 80 determinations can be made per man-day.

While the particular process herein described is well adapted to carry out the objects of the present invention, it is to be understood that various modifications and changes may be made all coming within the scope of the following claims.

What is claimed is:

1. A method for determining the presence and amount of silver in geologic materials comprising:

(a) digesting a sample of said material in concentrated nitric acid to form an acid solution, (b) intimately contacting said acid solution with a substantially immiscible organic solvent containing tri-isooctyl thiophosphate (TOTP), said TOTP being capable of extracting any silver present in the acid solution whereby said contacting step results in the formation of an aqueous raffinate phase and an immiscible organic extract phase containing the silver initially present in the acid solution, (c) separating the phases from one another, (d) intimately contacting the organic extract phase with dilute HCl having a normality no higher than about 0.3 N, said dilute HCl being capable of extracting any silver present in the organic extract phase, said dilute HCl being substantially immiscible in said organic solvent present in the organic extract phase whereby said HCl contacting step results in the formation of an organic raffinate phase and a substantially immiscible aqueous extract phase containing the silver previously present in said organic extract phase, (e) separating the organic raffinate phase and aqueous extract phase, (f) adding a persulfate ion-containing compound and a manganous ion-containing compound to said aqueous extract phase, heating the solution for a predetermined period of time to cause oxidation of said manganous ion to permanganate and thereby form a silver indicator sample solution, (g) preparing a series of standard permanganate solutions with varying known amounts of silver therein, (h) comparing colorwise, said silver indicator sample solution with said standard permanganate solutions to describe the amount of silver present in said sample solution.

2. The method of claim 1 wherein said organic carrier solvent is selected from the group consisting of benzene, carbon tetrachloride, and toluene.

3. The method of claim 2 wherein said TOTP comprises about 30% by volume of the organic extractment.

4. The method of claim 1 wherein said aqueous extract phase resulting from the latter extraction step (step d) is pretreated with persulfate ion and subjected to heating prior to the persulfate-manganous treatment and oxidation steps to prevent any TOTP present in said aqueous extract phase from interfering with the persulfate-manganous treatment and oxidation steps.

5. The method of claim 1 further comprising fusing said sample of material with ammonium persulfate prior to said digestion step.

References Cited

T. H. Handley et al.: Anal. Chem 32, 1878–83 (1960)

A. L. Underwood et al: Anal. Chem. 24, 1597–1601 (1952).

G. H. Faye et al.: Anal. Chem. 31, 1072–6 (1959).

MORRIS O. WOLK, *Primary Examiner.*

R. M. REESE, *Assistant Examiner.*